(12) United States Patent
Tsujimoto

(10) Patent No.: US 9,956,871 B2
(45) Date of Patent: May 1, 2018

(54) DRIVING APPARATUS OF ELECTRIC VEHICLE AND METHOD FOR ASSEMBLING DRIVING APPARATUS OF ELECTRIC VEHICLE

(71) Applicant: SUZUKI MOTOR CORPORATION, Hamamatsu-Shi, Shizuoka-Ken (JP)

(72) Inventor: Takanori Tsujimoto, Hamamatsu (JP)

(73) Assignee: SUZUKI MOTOR CORPORATION (JP)

( * ) Notice: Subject to any disclaimer, the term of this patent is extended or adjusted under 35 U.S.C. 154(b) by 0 days. days.

(21) Appl. No.: 15/336,059

(22) Filed: Oct. 27, 2016

(65) Prior Publication Data

US 2017/0113544 A1 Apr. 27, 2017

(30) Foreign Application Priority Data

Oct. 27, 2015 (JP) ................................ 2015-210391

(51) Int. Cl.
| | |
|---|---|
| *B60K 1/00* | (2006.01) |
| *B60K 17/04* | (2006.01) |
| *F16H 1/28* | (2006.01) |
| *F16H 57/021* | (2012.01) |
| *F16H 57/029* | (2012.01) |

(Continued)

(52) U.S. Cl.
CPC .............. *B60K 17/046* (2013.01); *B60K 1/00* (2013.01); *F16H 1/28* (2013.01); *F16H 57/021* (2013.01); *F16H 57/029* (2013.01); *B62M 7/06* (2013.01); *B62M 11/14* (2013.01); *F16H 2057/02034* (2013.01)

(58) Field of Classification Search
None
See application file for complete search history.

(56) References Cited

U.S. PATENT DOCUMENTS 6,074,321 A * 6/2000 Maeda .................... B60K 1/00
475/221
6,329,731 B1 * 12/2001 Arbanas ............. F16H 57/0416
310/52

(Continued)

FOREIGN PATENT DOCUMENTS

JP 2003191883 A 7/2003

*Primary Examiner* — James A Shriver, II
*Assistant Examiner* — Hilary L Johns
(74) *Attorney, Agent, or Firm* — Barnes & Thornburg LLP

(57) ABSTRACT

A driving apparatus of an electric vehicle that enables secure positioning and easy assembling, and a method for assembling the driving apparatus of the electric vehicle. A driving apparatus of an electric vehicle includes an electric motor provided in an electric motor case, the electric motor having an output shaft protruding outside the electric motor case, a planetary gear mechanism provided in a speed reducer case, the planetary gear mechanism transferring the driving force at a reduced speed from the output shaft to the driving wheel. The output shaft integrally includes a sun gear meshed with a planetary gear of the planetary gear mechanism. The speed reducer case includes a positioning section disposed concentrically with the output shaft, the positioning section being combined with the electric motor case. A meshing length between the sun gear and the planetary gear is larger than an insertion depth of the positioning section.

8 Claims, 10 Drawing Sheets

(51) Int. Cl.
*B62M 7/06* (2006.01)
*B62M 11/14* (2006.01)
*F16H 57/02* (2012.01)

(56) References Cited

U.S. PATENT DOCUMENTS

| | | | | |
|---|---|---|---|---|
| 6,499,549 B2* | 12/2002 | Mizon | ............... | B60K 6/26 180/65.25 |
| 6,729,201 B2* | 5/2004 | Mori | ............... | B25J 9/102 74/490.01 |
| 6,803,687 B2* | 10/2004 | Murakami | ............ | H02K 5/225 310/71 |
| 8,968,139 B2* | 3/2015 | Fukami | ............... | B60K 1/00 475/150 |
| 2014/0141918 A1* | 5/2014 | Fukami | ............... | B60K 1/00 475/150 |

* cited by examiner

DRIVING APPARATUS OF ELECTRIC VEHICLE AND METHOD FOR ASSEMBLING DRIVING APPARATUS OF ELECTRIC VEHICLE

CROSS-REFERENCE TO RELATED APPLICATIONS

This application claims the benefit of priority of Japanese Patent Application No. 2015-210391, filed on Oct. 27, 2015, the entire contents of which are incorporated herein by reference.

BACKGROUND OF THE INVENTION

Field of the Invention

The present invention relates to a driving apparatus of an electric vehicle, and a method for assembling the driving apparatus of an electric vehicle.

Description of the Related Art

There is known a driving apparatus of an electric motorcycle, including an electric motor, a planetary gear mechanism transferring the rotation of the electric motor at a reduced speed to an axle, and a rear arm accommodating the electric motor and attaching the planetary gear mechanism.

A driving apparatus of a conventional electric motorcycle includes an output shaft being concentric with respect to the axle, and a rotator rotating integrally with the output shaft (for example, see Patent Document 1 (Japanese Patent Laid-Open No. 2003-191883)).

In a driving apparatus of a conventional electric motorcycle, while a base end part of an output shaft is supported on a rear arm via a bearing, a sun gear is integrally provided on a protruded end side of the output shaft, and the sun gear is caused to mesh with a planetary gear, thereby supporting the protruded end part of the output shaft with the planetary gear mechanism.

For a driving apparatus of an electric motorcycle having such a structure, it is necessary to make the planetary gear mesh with the output shaft supported in a cantilever manner when combining the rear arm with the planetary gear mechanism.

At this moment, since the output shaft of the electric motor becomes an inclined state from a proper axis position, that is, an axis position after assembly, due to magnetic force of the electric motor. Thus the work to combine the planetary gear mechanism with the rear arm involves difficulty in positioning and requires expertise.

SUMMARY OF THE INVENTION

To solve the problems described above, it is an object of the present invention to provide a driving apparatus of an electric vehicle that enables secure positioning and easy assembling, and a method for assembling the driving apparatus of the electric vehicle.

To achieve the above object, an aspect of the present invention provides a driving apparatus of an electric vehicle including a driving wheel, an electric motor case, an electric motor provided in the electric motor case, the electric motor having an output shaft protruding outside the electric motor case, the electric motor generating driving force of the driving wheel, a speed reducer case combined with the electric motor case, and a planetary gear mechanism provided in the speed reducer case, the planetary gear mechanism transferring the driving force at a reduced speed from the output shaft to the driving wheel. The output shaft integrally includes a sun gear meshed with a planetary gear of the planetary gear mechanism. The speed reducer case includes a positioning section disposed concentrically with the output shaft, the positioning section being combined with the electric motor case. A meshing length between the sun gear and the planetary gear is larger than an insertion depth of the positioning section.

In preferred embodiments of the above aspect, the following modes may be provided.

It may be further desired that a bearing provided in the speed reducer case, the bearing rotatably supporting an end part of the output shaft. An insertion depth of the output shaft with respect to the bearing is smaller than the insertion depth of the positioning section.

It may be desired that the positioning section has a through hole. The output shaft is passed into the speed reducer case through the through hole. The through hole is provided with a seal member being in contact with the output shaft. The output shaft has a portion inserted into the speed reducer case deeper than a contact part with the seal member is, the portion has a smaller diameter than that of a seal surface of the seal member. A distance from the contact part to the small diameter portion is smaller than the insertion depth of the positioning section.

It may be further desired that a bearing provided in the speed reducer case, the bearing rotatably supporting an end part of the output shaft. The positioning section has a through hole. The output shaft is passed into the speed reducer case through the through hole. The through hole is provided with a seal member being in contact with the output shaft. The output shaft has a portion inserted into the speed reducer case deeper than a contact part with the seal member is, the portion has a smaller diameter than that of a seal surface of the seal member. A distance from the contact part to the small diameter portion is smaller than the insertion depth of the positioning section. An insertion depth of the output shaft with respect to the bearing is larger than the distance from the contact part to the small diameter portion.

To achieve the above object, an aspect of the present invention provides a method for assembling a driving apparatus of an electric vehicle including preparing a driving wheel, an electric motor case, an electric motor provided in the electric motor case, the electric motor having an output shaft protruding outside the electric motor case, the electric motor generating driving force of the driving wheel, a speed reducer case combined with the electric motor case, and a planetary gear mechanism transferring the driving force at a reduced speed from the output shaft to the rear wheel, integrally providing a sun gear in the output shaft, the sun gear being meshed with a planetary gear of the planetary gear mechanism, providing a positioning section in the speed reducer case, the positioning section being disposed concentrically with the output shaft and being combined with the electric motor case, and upon assembling the speed reducer case with the electric motor case, first meshing the sun gear with the planetary gear, and thereafter combining the positioning section with the electric motor case.

It may be further desired that providing a bearing rotatably supporting an end part of the output shaft in the speed reducer case, and upon assembling the speed reducer case with the electric motor case, inserting the output shaft into the bearing after the positioning section starts to be combined with the electric motor case.

It may be further desired that providing a through hole in the positioning section, the output shaft being passed into the speed reducer case through the through hole, providing a seal member in the hole, the seal member being in contact with the output shaft, configuring the output shaft being inserted into the speed reducer case deeper than a contact part with the seal member is, the output shaft having a smaller diameter than that of a seal surface of the seal member, and upon assembling the speed reducer case with the electric motor case, making the seal member come into contact with the output shaft after the positioning section starts to be combined with the electric motor case.

It may be further desired that providing a bearing in the speed reducer case, the bearing rotatably supporting an end part of the output shaft, providing a through hole in the positioning section, the output shaft being passed into the speed reducer case through the through hole, providing a seal member in the hole, the seal member being in contact with the output shaft, configuring the output shaft such that a portion being inserted into the speed reducer case deeper than a contact part with the seal member is, the portion having a smaller diameter than that of a seal surface of the seal member, and upon assembling the speed reducer case with the electric motor case, inserting the output shaft into the bearing after the positioning section starts to be combined with the electric motor case, and making the seal member come into contact with the output shaft after the output shaft starts to be inserted into the bearing.

This driving apparatus of the electric vehicle enables secure positioning and easy assembling, and the present invention provides the method for assembling the driving apparatus of the electric vehicle.

DETAILED DESCRIPTION OF THE PREFERRED EMBODIMENTS

Hereinafter, an embodiment of a driving apparatus of an electric vehicle, and the method for assembling the driving apparatus of the electric vehicle according to the present invention will be described with reference to FIGS. 1 to 10.

Figure 1:
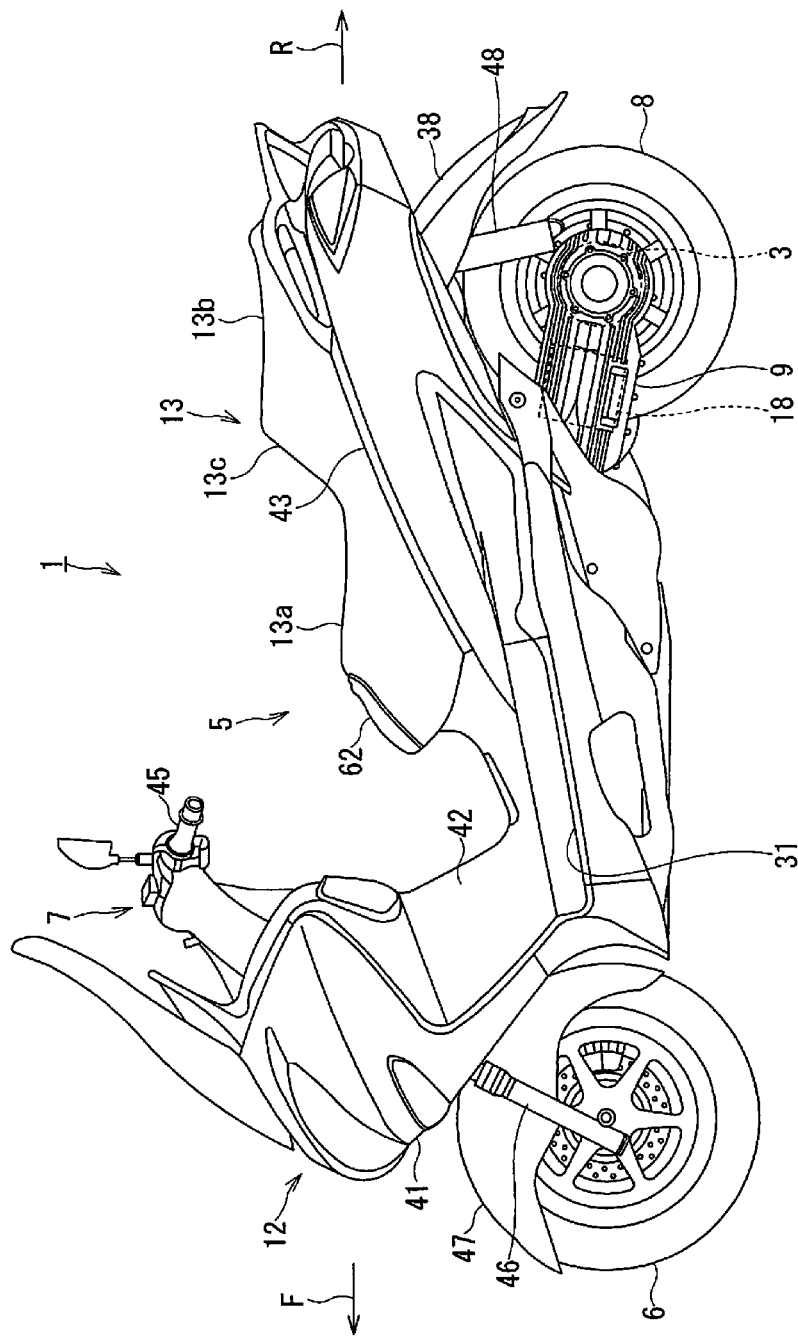
FIG. 1 is a left side view of an electric vehicle to which a driving apparatus is provided according to an embodiment of the present invention.

FIG. 1 is a left side view of the electric vehicle to which the driving apparatus is provided according to the embodiment of the present invention.

Figure 2:
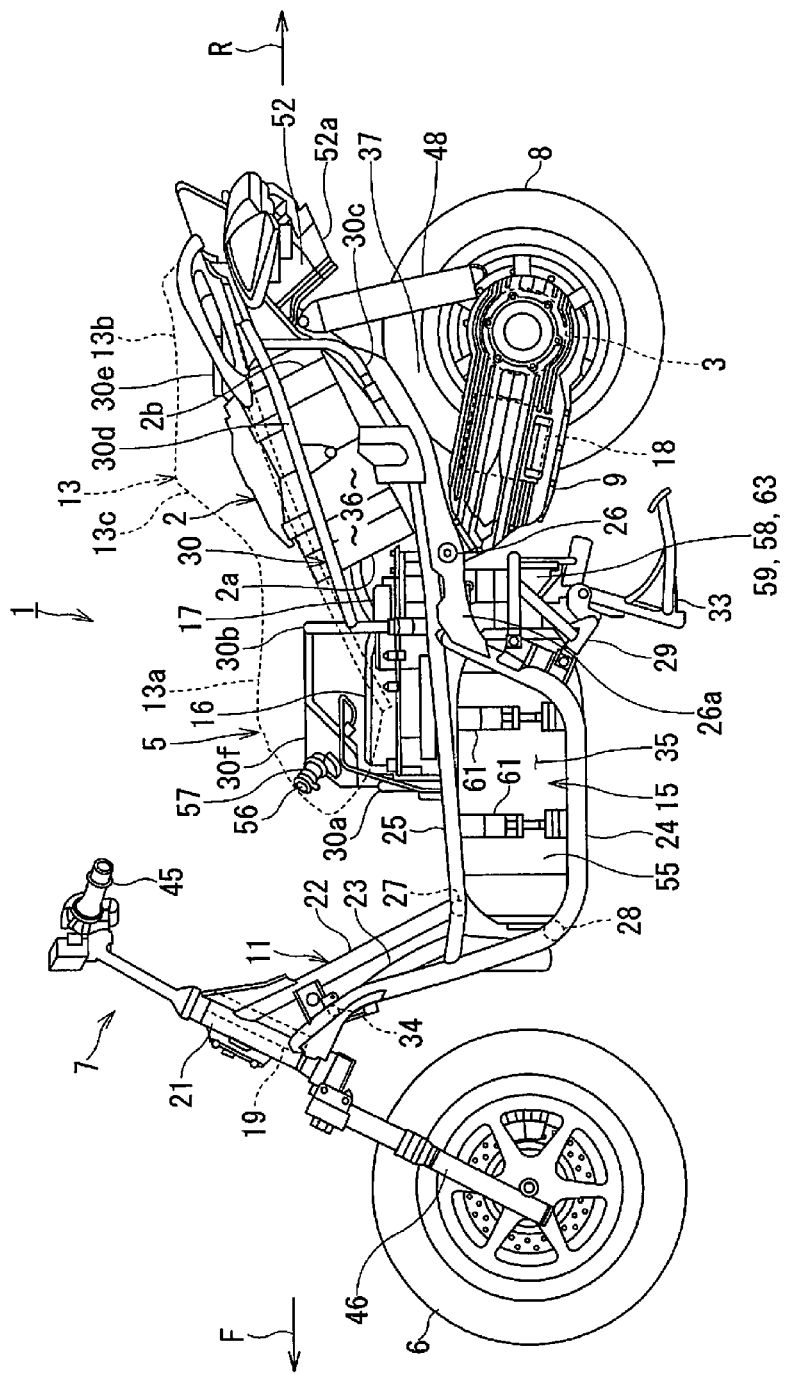
FIG. 2 is a left side view of the electric vehicle to which the driving apparatus is provided according to the embodiment of the present invention, with its exteriors detached.

FIG. 2 is a left side view of the electric vehicle to which the driving apparatus is provided according to the embodiment of the present invention, with its exteriors, for example, covers and a seat detached.

Figure 3:
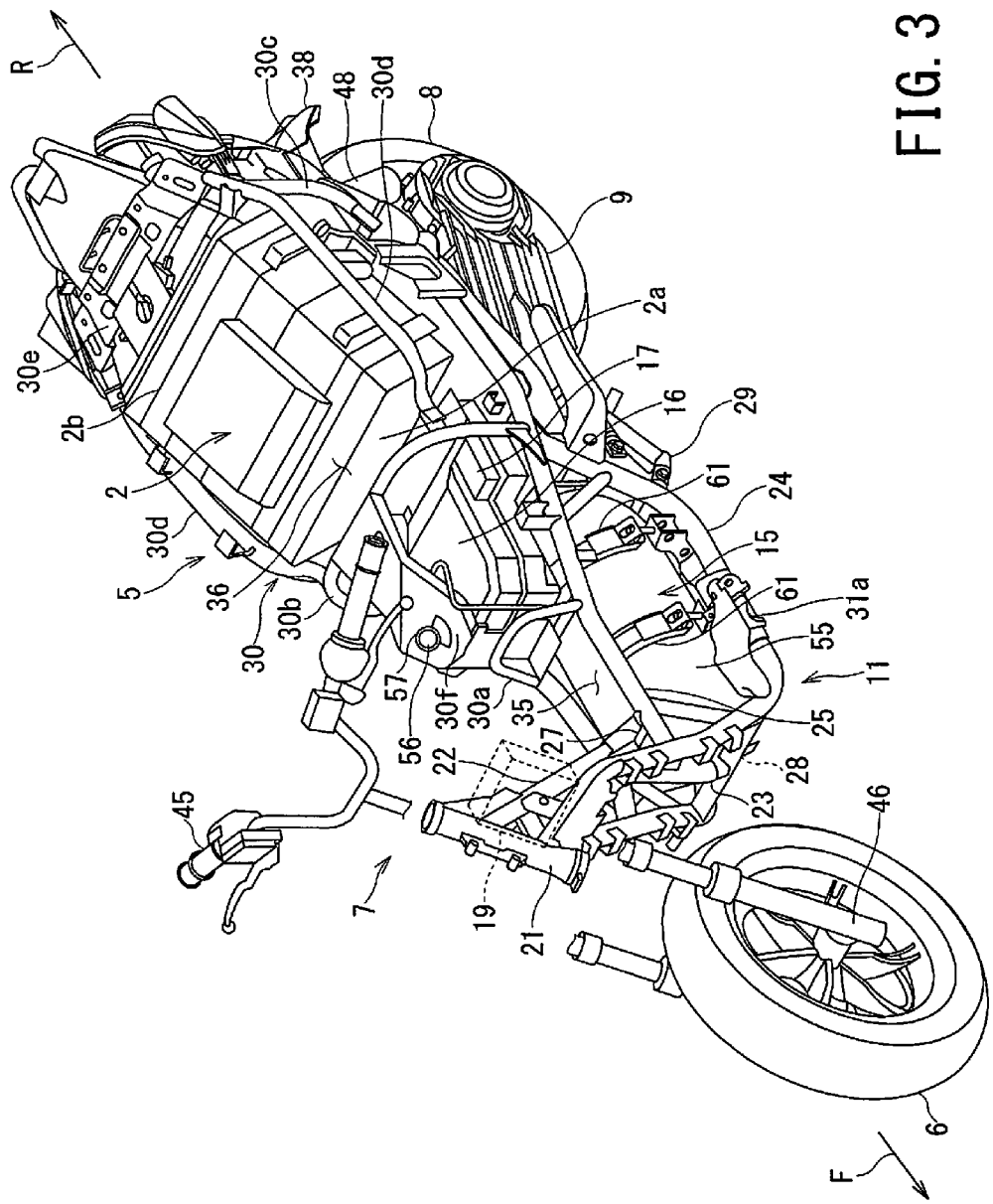
FIG. 3 is a perspective view of an electric vehicle to which the driving apparatus is provided according to the embodiment of the present invention, with its exteriors detached.

FIG. 3 is a perspective view of the electric vehicle to which the driving apparatus is provided according to the embodiment of the present invention, with its exteriors, for example, covers and a seat detached.

Note that expressions of front-and-rear, up-and-down, and left-and-right in the present embodiment are based on reference to a rider onboard an electric vehicle 1. In FIGS. 1 to 3, a solid line arrow F represents forward of the electric vehicle 1, and a solid line arrow R represents reward of the electric vehicle 1.

As shown in FIGS. 1 to 3, the electric vehicle 1 according to the present embodiment travels by being driven by an electric motor 3 powered by a fuel cell 2. The electric vehicle 1 is a motorcycle of motor-scooter type, and also a fuel cell powered bicycle traveling by the power of the fuel cell 2. The electric vehicle 1 may also be a tricycle. It may be a type of vehicle that travels by being driven by the electric motor 3 that is powered by a rechargeable battery (not shown) in place of the fuel cell 2.

The electric vehicle 1 includes a vehicle body 5 extending forward and rearward, a front wheel 6 as a steered wheel, a steering mechanism 7 supporting the front wheel 6 in a steerable manner, a rear wheel 8 as a driving wheel, a swing arm 9 supporting the rear wheel 8 so as to be swingable in the up and down direction, and the electric motor 3 which generates driving power of the rear wheel 8.

The vehicle body 5 includes a frame 11 extending forward and rearward of the vehicle, an exterior 12 covering the frame 11, and a seat 13 disposed above a rear half part of the frame 11.

Further, the vehicle body 5 includes a fuel cell 2, a fuel tank 15 configured to store high pressure gas of hydrogen as a fuel to be used for power generation in the fuel cell 2, a rechargeable battery 16 configured to supplement power of the fuel cell 2, a power management apparatus 17 configured to adjust output voltage of the fuel cell 2 and control power distribution between the fuel cell 2 and the rechargeable battery 16, an inverter 18 configured to convert DC power outputted by the power management apparatus 17 into three-phase AC power and outputs it to the electric motor 3 to operate the electric motor 3, and a vehicle controller 19 configured to comprehensively control those mentioned before.

A power train of the electric vehicle 1 includes the fuel cell 2 and the rechargeable battery 16, is a system which appropriately utilizes power of each power supply depending on travelling conditions of the vehicle, power generation conditions of the fuel cell 2, and power storage conditions of the rechargeable battery 16. The electric vehicle 1 generates regenerative power at the electric motor 3 during deceleration. The rechargeable battery 16 and the fuel cell 2, which are power sources of the vehicle, are connected in parallel to the inverter 18 and supply power to the electric motor 3. The rechargeable battery 16 stores regenerative power generated at the electric motor 3 when the electric vehicle 1 decelerates, and power generated by the fuel cell 2.

The frame 11 is made up of a plurality of steel hollow pipes combined into a single body. The frame 11 includes a head pipe 21 disposed above the front end of the frame 11, an upper down-frame 22 extending from a central part of the head pipe 21 in a rearwardly and downwardly inclined manner, a lower down-frame 23 disposed below the head pipe 21 and extending in a rearwardly and downwardly inclined manner, a pair of left and right lower frames 24, a pair of left and right upper frames 25, a pivot shaft 26, an upper bridge frame 27, a lower bridge frame 28, a guard frame 29, and a mounted-instrument protection frame 30.

The head pipe 21 supports the steering mechanism 7 so as to be steerable, that is, to be swingable in the left and right direction of the electric vehicle 1.

The pair of left and right lower frames 24 are disposed in the left and the right of the lower down-frame 23 and connected to a lower part of the head pipe 21. The pair of left and right lower frames 24 each include a front-side inclined portion extending from a connected portion with the head pipe 21 substantially in parallel along the lower down-frame 23 and in a rearwardly and downwardly inclined manner, a front-side curved portion curved rearwardly at a lower end of the front-side inclined portion, and a straight portion extending substantially horizontally from a rear end of the front-side curved portion toward rearward of the vehicle body 5 in a linear manner until reaching a central portion of the vehicle body 5, that is, a central portion in the front and rear direction of the electric vehicle 1. The pair of left and right lower frames 24 each include a rear-side curved portion curved toward rearward and upward from a rear end part of the straight portion, a rear-side inclined portion extending from an upper end part of the rear-side curved portion in a rearwardly and upwardly inclined manner, and an upper and lower frame joining part connecting the rear-side inclined portion to the upper frame 25. A spacing between the left and right lower frames 24 is wider than that between the left and right upper frames 25.

A near-head-pipe bridge frame 34 is constructed between upper parts of the left and right lower frames 24. The near-head-pipe bridge frame 34 extends in a linear manner substantially in the left and right direction of the electric vehicle 1. Each of the left and right lower frames 24 includes a foot rest bracket 31a. The foot rest bracket 31a supports a foot board 31, which is disposed on the outer side of the front-side curved portion, from below. A rider can lay its foot on the foot board 31.

The lower frame 24 being disposed on the left side of the vehicle body 5 includes a side stand bracket (not shown). The side stand bracket (not shown) is provided with a side stand (not shown) configured to make the electric vehicle 1 stand by itself in a leftwardly inclined manner. The side stand swings between an erected position for making the electric vehicle 1 stand by itself, and a retracted position for making it stay along the vehicle body 5 so as not to impede travelling.

The pair of left and right upper frames 25 are connected to a central part in the up-and-down direction of the front-side inclined portion of the lower frame 24 in a front half part of the vehicle body 5. The pair of left and right upper frames 25 each include, horizontal portions extending from a connected portion with the front-side inclined portion of the lower frame 24 toward rearward of the vehicle body 5 in a substantially horizontal manner, and rear end parts being rear ends of the horizontal portions of the pair of left and right upper frames 25, the rear end parts being significantly inclined rearwardly and upwardly in the rear half part of the vehicle body 5 and above the rear wheel 8, the rear end parts curved inwardly in the left and right direction of the vehicle body 5 to come close to each other to an extent of about thickness (width size) of the rear wheel 8.

The pivot shaft 26 is constructed between the left and right upper frames 25 in the rear half part of the vehicle body 5. The pivot shaft 26 is constructed between a pair of left and right brackets 26a. Each of the brackets 26a is located below the upper frame 25 and in the rear of a merging portion (upper and down frame joining part) between the upper frame 25 and the lower frame 24. Each of the brackets 26a is connected to the horizontal portion of the upper frame 25, and to the rear-side inclined portion of the lower frame 24.

The upper bridge frame 27 is constructed between the front end parts of the left and right upper frames 25. The upper bridge frame 27 extends substantially linearly in the left and right direction of the vehicle between the left and right upper frames 25 to interconnect the left and right upper frames 25.

The lower bridge frame 28 is constructed between the front-side curved portions of the left and right lower frames 24. The lower bridge frame 28 extends substantially linearly in the left and right direction of the vehicle between the left and right lower frames 24 to interconnect the left and right lower frames 24.

The guard frame 29 is constructed between the rear-side curved portions of the left and right lower frames 24. The guard frame 29 extends rearwardly and downwardly from a connected portion with the left and right lower frames 24, and extends into a rearwardly declined U-shape so as to enlarge the internal space of the frame 11. The guard frame 29 is provided with a center stand 33 configured to make the electric vehicle 1 stand by itself in an upright state. The center stand 33 swings between an erected position for making the electric vehicle 1 stand by itself, and a retracted position for making it stay along the vehicle body 5 so as not to impede travelling.

The upper down-frame 22 is constructed between the head pipe 21 and the upper bridge frame 27.

The lower down-frame 23 includes an upper end part connected to a central part in the left and right direction of the electric vehicle 1 of a near-head-pipe bridge frame 34 constructed between the left and right lower frames 24, and a lower end part connected to a central part in the left and right direction of the electric vehicle 1 of the lower bridge frame 28.

The mounted-instrument protection frame 30 is provided above the rear half part of the upper frame 25. The mounted-instrument protection frame 30 supports and secures the fuel cell 2 to the electric vehicle 1. A part of the mounted-instrument protection frame 30 can be attached and detached to and from the upper frame 25.

The seat 13 extends forward and rearward covering an upper section of the rear half part of the frame 11. The seat 13 is of a tandem type and includes a front half part 13a on which the rider is to be seated, a rear half part 13b on which a passenger is to be seated, and an inclined part 13c between the front half part 13a and the rear half part 13b.

Here, a space surrounded by the left and right upper frames 25 and the left and right lower frames 24 is referred to as a center tunnel region 35. A space surrounded by the rear half part of the upper frame 25, exterior 12, and the seat 13 as an instrument mounting region 36. A space in the rear of the center tunnel region 35 and below the instrument mounting region 36 as a tire house region 37.

The center tunnel region 35 accommodates the fuel tank 15. In the electric vehicle 1 of a motor-scooter type according to the present embodiment, the center tunnel region 35 is disposed along the front and rear direction of the electric vehicle 1 and between left and right foot boards 31 on which the rider places its foot, and rises higher than the foot board 31 such that the foot resting region of the foot board 31 is divided into left and right sections. In other words, the foot board 31, which serves as the foot resting region, is disposed in the left and right of the center tunnel region 35, and the fuel tank 15 is disposed between the left and right foot boards 31.

The instrument mounting region 36 accommodates the rechargeable battery 16, the power management apparatus 17, and the fuel cell 2 in this order from the front side of the vehicle body 5. The mounted-instrument protection frame 30 protects the front end part, the central part, the rear end part, and a side part ranging from the central part to the rear end part of the instrument mounting region 36.

The mounted-instrument protection frame 30 surrounds the instrument mounting region 36 and protects instruments to be mounted in the instrument mounting region 36. The mounted-instrument protection frame 30 includes a front protection frame 30a disposed in the front end part of the instrument mounting region 36, the front protection frame 30a being constructed between the left and right upper frames 25 in an upwardly convex arch shape, a center protection frame 30b disposed in a central part of the instrument mounting region 36 and in the rear of a merging spot between the upper frame 25 and the lower frame 24, the center protection frame 30b being constructed between the left and right upper frames 25 in an upwardly convex arch shape, a pair of left and right rear protection frames 30c disposed at a rear end part of the instrument mounting region 36, the pair of left and right rear protection frames 30c being connected to a portion where each of the left and right upper frames 25 is curved inwardly, the pair of left and right rear protection frames 30c extending rearward and obliquely upward from the curved portion, a pair of left and right side protection frames 30d extending rearward from each of the left and right of the center protection frame 30b to be connected to the upper end parts of the rear protection frames 30c, the pair of left and right side protection frames 30d reaching the rear end part of the vehicle body 5, a bracket 30e constructed between rear end parts of the left and right side protection frames 30d.

The left and right upper frames 25 are bent at a spot where the lower ends of the front protection frame 30a are joined thereto, increase the spacing therebetween toward the rear of the electric vehicle 1. The left and right upper frames 25 are bent at a spot where the lower ends of the center protection frame 30b are joined thereto, and extend to the rear of the electric vehicle 1. Thus, the center protection frame 30b has a larger width and a larger height than those of the front protection frame 30a. The rear protection frame 30c and the pair of the left and right side protection frames 30d are integrated.

The rear protection frame 30c and the pair of left and right side protection frames 30d are detachably interconnected to the center protection frame 30b and the upper frames 25, thereby supporting the fuel cell 2.

A rear wheel 8 is disposed in the tire house region 37.

Between the instrument mounting region 36 and the tire house region 37, a rear fender 38 as a partition member for dividing respective regions is provided.

The exterior 12 includes, a front leg-shield cover 41 covering a front half part of the vehicle body 5, a front frame cover 42 disposed above the center of the vehicle body 5 and covering an upper section of the upper frame 25 such as the center tunnel region 35, and a frame cover 43 disposed in a rear half part of the vehicle body 5 and covering a lower portion of the seat 13.

The frame cover 43 along with the seat 13 surrounds the instrument mounting region 36. The instrument mounting region 36 is a closed space surrounded by the seat 13, the frame cover 43, and the rear fender 38. The instrument mounting region 36 easily and securely controls flow of air to the fuel cell 2 by means of a vent hole (not shown) provided in an appropriate area of the frame cover 43 or the rear fender 38, and also easily and securely controls flow of air as a cooling wind to an apparatus, which needs to be cooled. The instrument mounting region 36 allows air to enter from, for example, a joint of each cover (such as the front frame cover 42, and a frame cover 43).

The steering mechanism 7 is disposed in a front section of the vehicle body 5 and swings in the left and right direction centering on the head pipe 21 of the frame 11, thereby enabling steering of the front wheel 6. The steering mechanism 7 includes a handle 45 provided in a top part, and a pair of left and right front forks 46 interconnecting the handle 45 and the front wheel 6, and the pair of left and right front forks 46 extending in the up and down direction slightly inclined rearwardly. The left and right front forks 46 have a telescopic structure that can be elastically expanded and contracted. An axle (not shown) for rotatably supporting the front wheel 6 is constructed between lower end parts of the left and right front forks 46. The front fender 47 is disposed above the front wheel 6. The front fender 47 is located between the left and right front forks 46, and secured to the front fork 46.

The front wheel 6 is a driven wheel that is rotatable about the axle constructed between the lower end parts of the left and right front forks 46.

The swing arm 9 swings in the up and down direction about the pivot shaft 26 as a rotational center extending in the left and right direction of the vehicle body 5. The swing arm 9 rotatably supports the rear wheel 8 between a pair of arms extending in the front and rear direction on left and right sides of the vehicle body 5, respectively. A rear suspension 48 is constructed between the frame 11 and the swing arm 9. The upper end part of the rear suspension 48 is swingably supported at the rear end part of the upper frame 25. The lower end part of the rear suspension 48 is swingably attached to the rear end part of the swing arm 9. The rear suspension 48 buffers the swinging of the swing arm 9.

The swing arm 9 accommodates a electric motor 3 rotationally driving the rear wheel 8, and an inverter 18 converting DC power supplied from the fuel cell 2 into AC power to supply it to the electric motor 3.

The electric motor 3 rotationally drives the rear wheel 8 with power supplied from the fuel cell 2 or the rechargeable battery 16, thereby causing the electric vehicle 1 to travel. The electric motor 3 is accommodated in a rear part of the swing arm 9 and coaxially disposed with the axle of the rear wheel 8. The electric motor 3 is integrally assembled to the swing arm 9 to constitute a unit-swing-type swing arm.

The inverter 18 is accommodated in a front part of the swing arm 9, and disposed between the pivot shaft 26 and the electric motor 3. The inverter converts DC power outputted by the power management apparatus 17 into three-phase AC power, and adjusts the rotational speed of the electric motor 3 by altering the frequency of the AC power.

The rear wheel 8 is the driving wheel being supported by the axle (not shown) to which driving force is transferred from the electric motor 3.

The fuel cell 2 generates power by causing reaction between a fuel and an oxidizing agent. The fuel cell 2 is an air-cooled fuel cell system generating power by using a high pressure gas, for example, hydrogen gas as the fuel, and oxygen in the air as the oxidizing agent, and is cooled by using air.

The fuel cell 2 is disposed on the rear half side of the instrument mounting region 36. The fuel cell 2 is disposed below the seat 13 over a range from an inclined part between the front half part 13*a* and rear half part 13*b* to the rear half part 13*b*. That is, in the side view of the vehicle, the fuel cell 2 is disposed between the rear half part 13*b* of the seat 13, on which the passenger is to be seated, and the rear wheel 8 and the swing arm 9.

The fuel cell 2 has a cuboidal shape having a long side extending in the front and rear direction of the vehicle body 5, and is disposed in the instrument mounting region 36 in a posture in which its front face, in which the intake port 2*a* is disposed, faces forward and obliquely downward, and its back face, in which the exhaust port 2*b* is disposed, faces rearward and obliquely upward. That is, the fuel cell 2 is secured to the frame 11 in a forward leaning posture in which its front side is located lower than its rear side. The upper part of the fuel cell 2 is secured to a mounted instrument protection frame 30 and the lower part of the fuel cell 2 is secured to the upper frame 25.

The fuel cell 2 includes a plurality of flat modules interconnected from the front side toward the rear side. The fuel cell 2 includes a filter (not shown), an intake shutter (not shown), a fuel cell stack (not shown), a fan (not shown), and an exhaust shutter (not shown), which are interconnected by being superposed on each other in a laminated state in order from the front side. A fuel cell control unit (not shown) is provided on the top face of the fuel cell 2.

The intake shutter includes an openable/closable intake port 2*a* of air, and configured to control the amount of air introduced to the fuel cell stack by opening/closing the intake port 2*a*. The intake shutter configured to constitute a circulation path for circulating air in the fuel cell 2 by closing the intake port 2*a*. The exhaust shutter includes an openable/closable exhaust port 2*b* of air and configured to constitute the circulation path for circulating air in the fuel cell 2 by closing the exhaust port 2*b*. In other words, the fuel cell 2 includes the openable/closable intake port 2*a* in the front face, and the openable/closable exhaust port 2*b* in the back face, and configured to cause air to be circulated in the fuel cell 2 by closing the intake port 2*a* and the exhaust port 2*b*.

The fuel cell stack causes electrochemical reaction between oxygen contained in the air drawn through the intake port and hydrogen supplied from the fuel tank 15 to generate power, and produces a wet excess gas after generation.

The fan generates intake negative pressure for drawing air in the instrument mounting region 36 from the intake port into the fuel cell 2, while drawing out the excess gas from the fuel cell stack and discharges it from the exhaust port. The flow of air being caused by the fan is used for the power generation in the fuel cell stack, as well as for the cooling of the fuel cell 2.

An exhaust duct 52 is provided in the rear of the fuel cell 2. The fan of the fuel cell 2 draws out excess gas from the fuel cell stack and discharges it to the exhaust duct 52. The front end part of the exhaust duct 52 is airtightly connected to a box, which is a frame body of the exhaust shutter, of the fuel cell 2. The exhaust duct 52 includes an exhaust port 52*a* opened toward rearwardly downward, and rearwardly upward at the rear end of the vehicle body 5. The exhaust duct 52 guides exhaust gas (excess gas) ejected from the fan of the fuel cell 2 to the exhaust port 52*a* and discharges it to the rear of the vehicle body 5.

The exhaust port 52*a* is disposed higher than the exhaust face (back face), and preferably at the upper end part of the rear section of the exhaust duct 52. In other words, the upper edge part of the exhaust port 52*a* is disposed at a position higher than the exhaust port of the fuel cell 2. As a result of having the exhaust port 52*a* disposed to be higher than the exhaust face (back face) of the fuel cell 2, the exhaust duct 52 guides a wet excess gas containing unreacted hydrogen gas to the exhaust port 52*a* and securely discharge it from the vehicle body 5.

The fuel tank 15 is a high-pressure compressed hydrogen storage system. The fuel tank 15 includes a pressure vessel 55 made of carbon fiber reinforced plastic (CFRP), or being a composite vessel made from an aluminum liner, a fuel filling joint 57 having a fuel filling port 56, a fuel filling main valve 58, a fuel supply main valve 59 integrally including a shut-off valve (not shown) and a regulator (not shown), and a secondary pressure reducing valve (not shown).

The pressure vessel 55 is a composite vessel made from an aluminum liner which stores hydrogen gas as fuel of the fuel cell 2. The fuel tank 15 stores, for example, hydrogen gas of about 70 megapascal (MPa.) The pressure vessel 55 includes a cylinder-shaped barrel part, and a dome-shaped mirror plate provided on front and rear end faces of the barrel part. The pressure vessel 55 is disposed in the center tunnel region 35 with the central axis of the cylindrical barrel being aligned along the front and rear direction of the vehicle body 5. The pressure vessel 55 is surrounded by a pair of upper frames 25, a pair of lower frames 24, a lower bridge frame 28, and a guard frame 29, and is robustly protected against load due to turning over or collision of the electric vehicle 1.

The pressure vessel 55 is supported in the center tunnel region 35 by a clamp band 61 constructed between an upper frame 25 disposed at one side of the vehicle body 5, for example, the upper frame 25 disposed at the right side of the vehicle body 5, and a lower frame 24 disposed at another side of the vehicle body, for example, the lower frame 24 disposed at the left side of the vehicle body 5. The pressure vessel 55 is placed on a lower clamp band, for example, a lower half part of the clamp band 61 being constructed between the right side upper frame 25 and an left side lower frame 24, and is clamped by the upper clamp band, for example, an upper half part of the clamp band 61 to be sandwiched. Note that the clamp band 61 may be constructed between the upper frame 25 disposed at the left side of the vehicle body 5 and the lower frame 24 disposed at the right side of the vehicle body 5.

The fuel filling joint 57 is disposed outside of the center tunnel region 35, more specifically, rearwardly upward of the center tunnel region 35, and at the front end part of the instrument mounting region 36. The fuel filling joint 57 is disposed to be higher than or just above the rechargeable battery 16. The fuel filling joint 57 is secured to the joint bracket 30*f* being constructed between the upper parts of the front protection frame 30*a* and the center protection frame 30*b* of the mounted-instrument protection frame 30. The fuel filling joint 57 extends toward upward, and slightly leftward of the vehicle body 5 such that a facility side joint can be inserted from the upper side and left side of the vehicle body at the time of fuel filling. The fuel filling joint 57 is covered and hidden by the fuel filling port lid 62 being disposed at the front end of the seat 13. The fuel filling port lid 62 is supported by the seat 13 via a hinge mechanism (not shown), and opens/closes by being swung. The fuel filling joint 57 has a fuel filling port 56 as an inlet for introducing high pressure gas of hydrogen as a fuel into the fuel tank 15.

The fuel filling port 56 is disposed at a top part of the fuel filling joint 57. The fuel filling port 56 is oriented toward the upper left of the vehicle body 5. In filling the fuel tank 15 with fuel, the upward of the fuel filling port 56 is opened to the atmosphere in a state in which the fuel filling port lid 62 is opened. Thus, in charging high pressure gas, for example, hydrogen gas as fuel, into the fuel tank 15, even if the high pressure gas leaks, the leaked fuel diffuses toward the upward of the electric vehicle 1 without residing therein.

A fuel filling main valve 58 and a fuel supply main valve 59 are integrated and incorporated in a tank valve 63 provided on the top part of the rear-side mirror plate of the pressure vessel 55. The tank valve 63 is disposed in a space surrounded by the guard frame 29. The fuel supply main valve 59 includes a shut-off valve (not shown) and a primary pressure reducing valve (not shown). The fuel filling main valve 58 and the shut-off valve of the fuel supply main valve 59 are an on-off valve using an electromagnetic valve. The primary pressure reducing valve and the secondary pressure reducing valve of the fuel supply main valve 59 successively reduce and thereby adjust the pressure of the high pressure fuel gas from the pressure vessel 55.

The rechargeable battery 16 is a box-shaped lithium ion battery. The rechargeable battery 16 is disposed in the front end part of the instrument mounting region 36 and between the rear half part of the pressure vessel 55, that is, the rear half part of the cylindrical barrel and the rear-side mirror plate, and the front half part 13a of the seat 13.

Note that, the electric vehicle 1 includes, besides the rechargeable battery 16, a second rechargeable battery (not shown) supplying, for example, 12V-based power as a power supply for meters (not shown) and lights (not shown). The second rechargeable battery is disposed around the head pipe 21, for example, beside the right side of the head pipe 21.

In the electric vehicle 1, even if hydrogen gas as fuel leaks from the fuel filling port 56, the hydrogen gas, which is lighter than air, moves up, thus diffusing to the outside of the electric vehicle 1 without residing within the electric vehicle 1. Even if hydrogen gas as fuel leaks from the fuel filling main valve 58 or the fuel supply main valve 59, the hydrogen gas moves toward the tire house region 37, thus diffusing to the outside of the electric vehicle 1 without residing within the electric vehicle 1.

The power management apparatus 17 is disposed between the rechargeable battery 16 and the fuel cell 2 in the instrument mounting region 36, and is secured to the frame 11. Note that the power management apparatus 17 may be disposed along with the rechargeable battery 16 in a same waterproof case.

By disposing the rechargeable battery 16, the power management apparatus 17, and the fuel cell 2 in a manner as described above, it becomes possible to dispose apparatuses adjoining to each other in the electrical connection to be closer to each other as much as possible, thus shortening the wiring length between the apparatuses, and reducing the weight relating to the wiring.

The vehicle controller 19 is disposed around the head pipe 21 being a relatively high place in the electric vehicle 1, for example, beside the left side of the head pipe 21 corresponding to the opposite side of the second rechargeable battery, which supplies 12V-based power.

Next, the swing arm 9 of the electric vehicle 1 will be described in detail.

Figure 4:
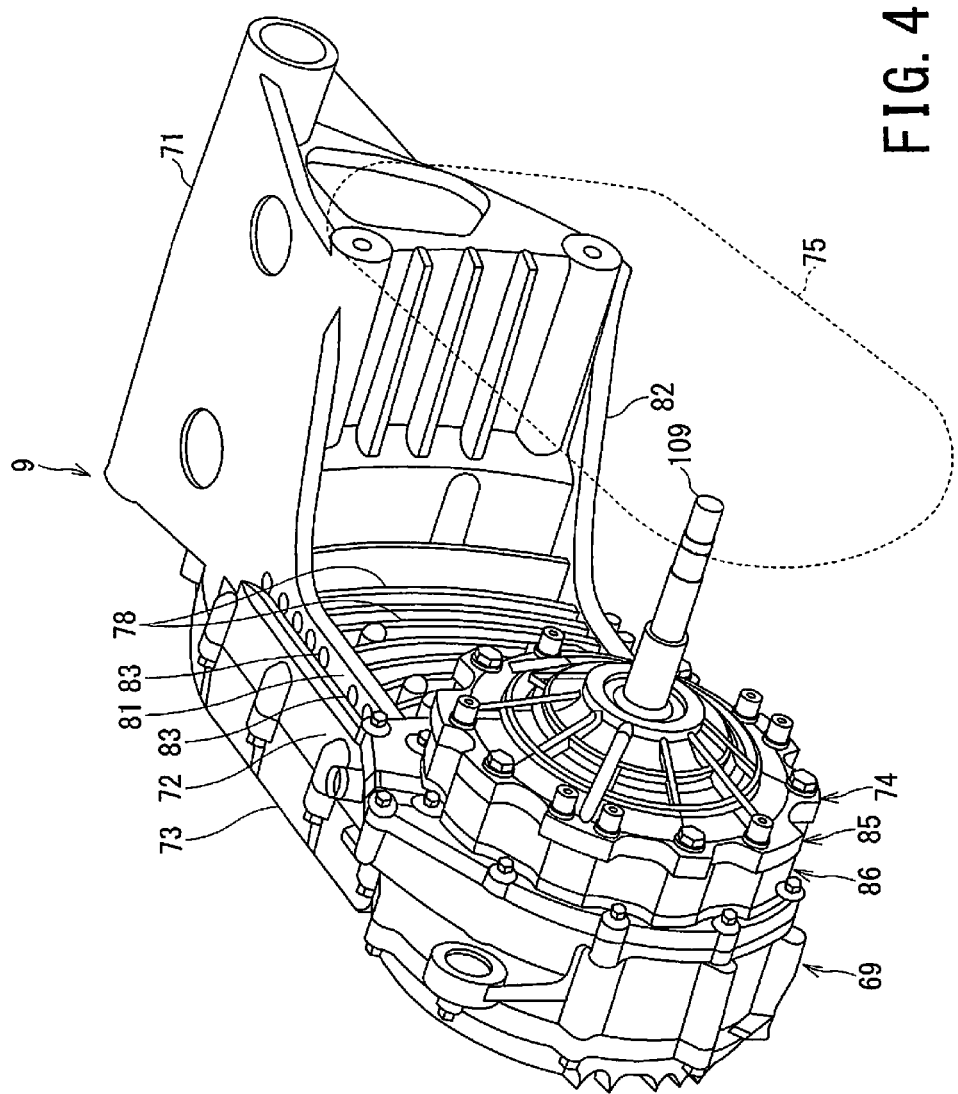
FIG. 4 is a right rear side perspective view of a swing arm of the electric vehicle to which the driving apparatus is provided according to the embodiment of the present invention.

FIG. 4 is a right rear side perspective view of the swing arm of the electric vehicle to which the driving apparatus is provided according to the embodiment of the present invention.

Figure 5:
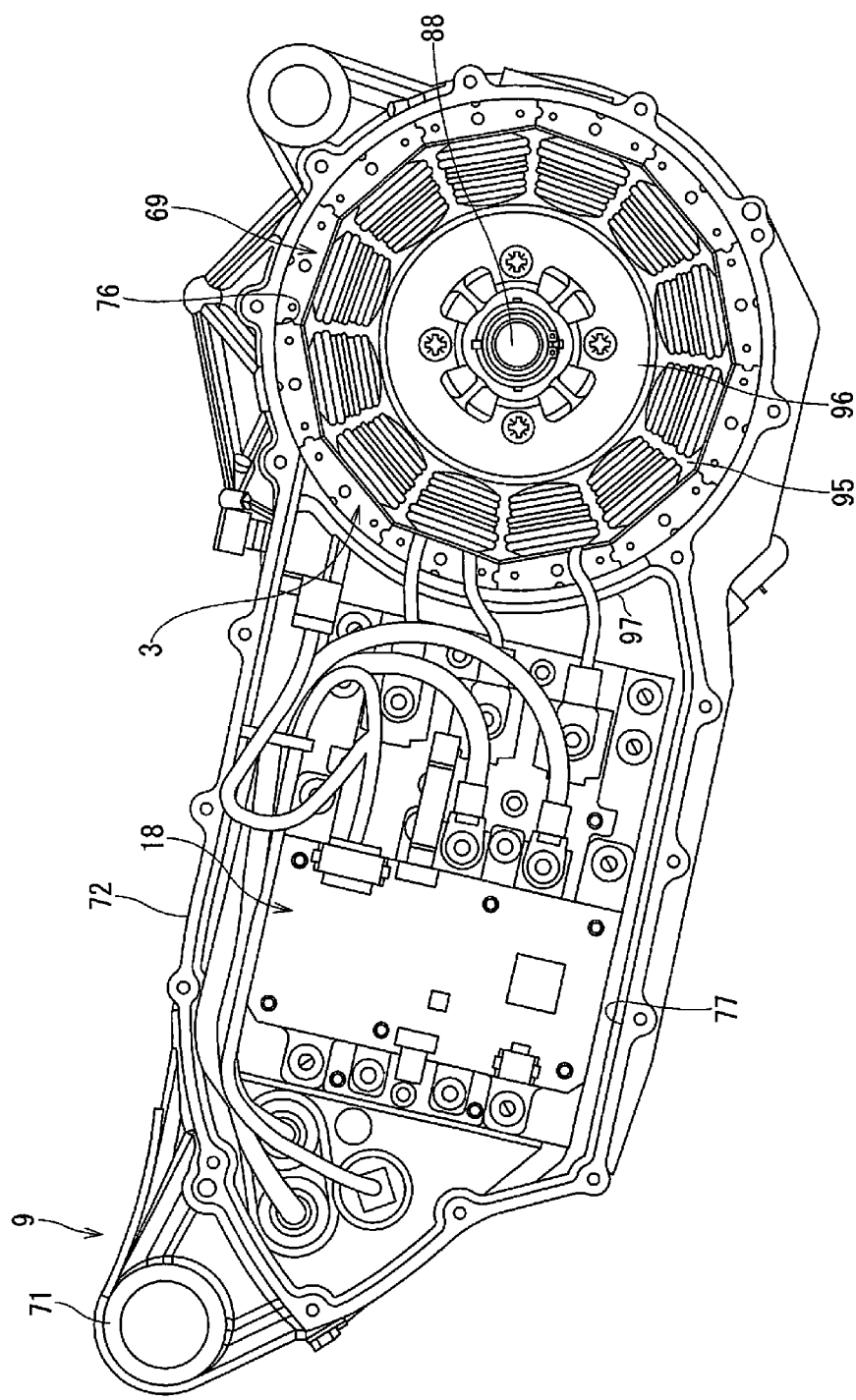
FIG. 5 is a left side view of the swing arm of the electric vehicle to which the driving apparatus is provided according to the embodiment of the present invention.

FIG. 5 is a left side view of the swing arm of the electric vehicle to which the driving apparatus is provided according to the embodiment of the present invention.

Note that FIG. 5 shows a state in which a cover 73 is detached from an arm 72.

As shown in FIGS. 4 and 5, the driving apparatus 69 of the electric vehicle 1 according to the present embodiment is provided in the swing arm 9.

The swing arm 9 includes a pivot section 71 supported by the frame 11 through the pivot shaft 26, an arm 72 extending from either one of the sides, for example, the left side of the pivot section 71 rearwardly to reach the left side of the rear wheel 8, a cover 73 covering the left side face of the arm 72, a speed reducer 74 disposed between the arm 72 and the rear wheel 8, an arm 75 extending from the other of the sides, for example, the right side of the pivot section 71 rearwardly to reach the right side of the rear wheel 8.

The pivot section 71 corresponds to a front end part of the swing arm 9. The pivot section 71 extends in the width direction of the frame 11, and spreads to whole width of the inside of the frame 11. In a side view, the pivot section 71 is a box body having a triangular shape or a fan shape, which spreads rearwardly and downwardly with a part through which the pivot shaft 26 is passed as a vertex. The pivot section 71 has a weight reduction hole in each of upper, lower, left and right walls.

The internal space defined by the left-side arm 72 and the cover 73 serves as a driving unit housing accommodating the electric motor 3 and the inverter 18. The arm 72 and the cover 73 are combined in such a way to be separable in the left and right direction of the electric vehicle 1 with a dividing face, which is perpendicular to the vehicle body 5 and extends in the front and rear direction of the vehicle body 5, as a boundary. That is, the arm 72 and the cover 73 are separated and combined by a plane perpendicular to the left and right direction of the electric vehicle 1.

The arm 72 is integrally formed with the pivot section 71. The arm 72 has an inner wall surface facing the side face, for example, the left side face of the rear wheel 8. The arm 72 defines a space opening to the left side of the vehicle body 5. The arm 72 accommodates the electric motor 3 and the inverter 18 in this space.

In a rear end part of the space in the arm 72, a motor chamber 76 for accommodating the electric motor 3 is defined. In the space located in front of the motor chamber 76, that is, a space closer to the pivot section 71 than the motor chamber 76, an inverter chamber 77 for accommodating the inverter 18 is defined. The motor chamber 76 and the inverter chamber 77 are closed by the cover 73 so that inflow of outside air is restricted.

The motor chamber 76 annularly surrounds the outer periphery of the electric motor 3.

Of the wall surfaces defining the inverter chamber 77, the wall surface to which the inverter 18 is attached is the inner face of the wall facing the rear wheel 8, and is a flat face. A plane including the wall surface is perpendicular to the rotational center line, that is, the axle of the rear wheel 8. The space between the flat wall surface to which the inverter 18 is attached and the inverter 18 is filled with heat radiation grease (not shown). The heat radiation grease is expected to thermally connect the inverter 18 with the arm 72.

The arm 72 includes a plurality of heat radiation fins 78 provided in its inner wall surface facing the rear wheel 8. The heat radiation fins 78 extend in an arc-shape delineating concentric circles of the rear wheel 8. Each heat radiation fin 78 extends in an arc-shape which radius substantially corresponds to its distance from the rotational center line, that is, the axle center of the rear wheel 8. The heat radiation fins 78 are arranged substantially at an equal interval. The heat radiation fins 78 protrude from the inner wall surface of the arm 72 toward the rear wheel 8.

Each heat radiation fin 78 extends continuously to at least either the top face or the bottom face of the arm 72. Each heat radiation fin 78 has a varying protruding height conforming to the shape of the rear wheel 8. The heat radiation fins 78 protrude conforming to the shape of the rear wheel 8 so as to leave gaps to an extent not to interfere with the rear wheel 8, and keep the gaps substantially constant.

The arm 72 includes reinforcing ribs 81, 82 extending in the front and rear direction intersecting the heat radiation fins 78, or along end parts of the heat radiation fins 78.

The reinforcing ribs 81, 82 are provided on the inner wall surface facing the rear wheel 8, and protrude toward the rear wheel 8. The protruding heights of the reinforcing ribs 81, 82 are larger than those of the heat radiation fins 78 within a range not to interfere with the rear wheel 8. The reinforcing rib 81 is provided so as to interconnect with the top face of the arm 72 and to be along the upper end parts of the heat radiation fins 78. The reinforcing rib 82 is provided so as to interconnect with the bottom face of the arm 72 and to be along the lower end parts of the heat radiation fins 78.

The reinforcing ribs 81, 82, as well as the heat radiation fin 78, have varying protruding heights conforming to the shape of the rear wheel 8. The reinforcing ribs 81, 82 respectively protrude conforming to the shape of the rear wheel 8 so as to leave gaps to an extent not to interfere with the rear wheel 8, and keep the gaps substantially constant.

The reinforcing rib 81 extends in such a way to cross the front face of the rear wheel 8 from the arm 72 to the back face of the pivot section 71 and reinforces a discontinuous portion, which is connection portion between the arm 72 and the pivot section 71, of the shape of the swing arm 9.

The reinforcing ribs 81, 82 have wind guiding ports 83 connecting to space between adjoining heat radiation fins 78. The wind guiding ports 83 straighten air flow generated through rotation of the rear wheel 8 and smoothly guide it to the heat radiation fins 78, and thus smoothly discharge it.

The cover 73 is detachably mounted to the arm 72 and plays a role of a lid for closing the driving unit housing.

Note that the driving unit housing may be disposed on the right side of the vehicle body 5. In this case, the driving unit housing is made from combination of the right side arm 75 and the cover 73, and thus the relation thereof in the left and right direction is reversed.

The right side arm 75 is secured to the right side face of the pivot section 71 by a fastener (not shown), for example, a bolt.

The speed reducer 74 includes a speed reducer case 85 secured to the arm 72, and a planetary gear mechanism 86 accommodated in the speed reducer case 85.

The speed reducer 74 is attached to the surface, for example, right side surface of the rear end part of the arm 72 on the side of the rear wheel 8.

Figure 6:
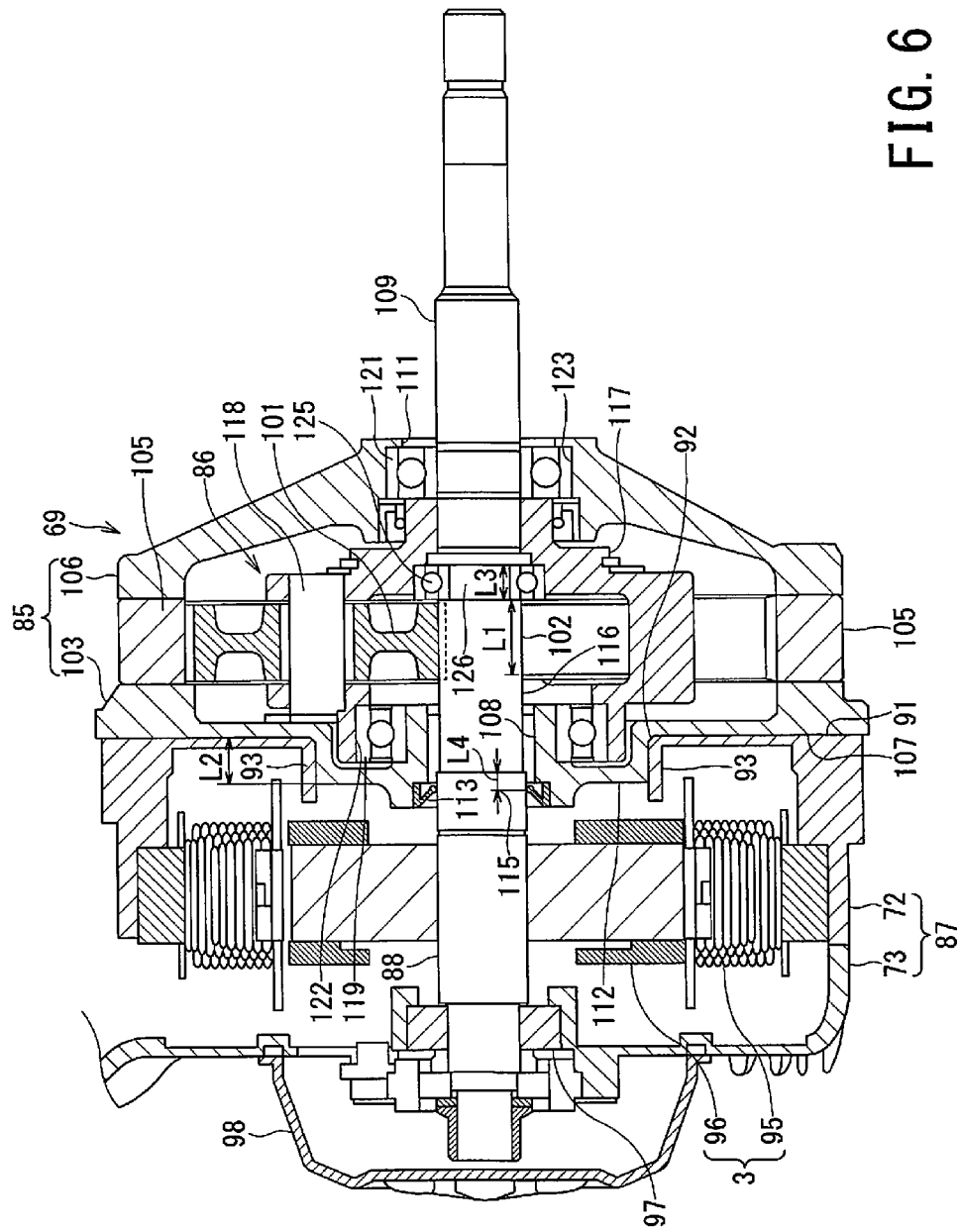
FIG. 6 is a sectional view of the driving apparatus of the electric vehicle according to the embodiment of the present invention.

FIG. 6 is a sectional view of the driving apparatus of the electric vehicle according to the embodiment of the present invention.

As shown in FIG. 6 as well as in FIGS. 4 and 5, the driving apparatus 69 of the electric vehicle 1 according to the present embodiment includes the arm 72 and the cover 73 as an electric motor case 87, the electric motor 3 being provided in the electric motor case 87 with an output shaft 88 protruding outside the electric motor case 87 and generating driving force to a rear wheel 8, a speed reducer case 85 combined with the electric motor case 87, and a planetary gear mechanism 86, provided in the speed reducer case 85, transferring the driving force at a reduced speed from the output shaft 88 to the rear wheel 8.

The electric motor case 87, which is the arm 72 and the cover 73, is also a part of the swing arm 9. The arm 72 includes a flat face 91 perpendicular to the left and right direction of the electric vehicle 1 as a joining face to interconnect the speed reducer case 85, and a circular positioning opening 92 pierced in the flat face 91 and makes the output shaft 88 of the electric motor 3 protrude to the outside of the electric motor case 87, and is fitted to a part of the speed reducer case 85.

The positioning opening 92 is disposed concentrically with the rotational axis of the rear wheel 8 and the output shaft 88. Inside the arm 72, a positioning ring 93 is provided. The positioning ring 93 extends in an annular shape along the positioning opening 92. As the inner diameter of the positioning ring 93 coming into contact with the speed reducer case 85, the relative positional relationship between the electric motor case 87 and the speed reducer case 85 is determined.

The electric motor 3 includes an annular stator 95 secured to the motor chamber 76 in the arm 72, a disc-shaped rotator 96 disposed at a central part of the stator 95, and an output shaft 88 passing through the center of the rotator 96.

The output shaft 88 extends in the width direction of the vehicle body 5, and is disposed on the rotational center line, that is, the axle center of the rear wheel 8. The output shaft 88 is rotatably and integrally secured to the rotator 96. One end part of the output shaft 88 is supported by being interconnected to the speed reducer 74 provided between the arm 72 and the rear wheel 8. The other end part of the output shaft 88 is rotatably supported by a first bearing 97 provided in the cover 73. The other end part of the output shaft 88 passes through the cover 73 and reaches the outside of the cover 73. The other end part of the output shaft 88 is covered and hidden by a cap 98 secured to the outside of the cover 73.

The output shaft 88 integrally includes a sun gear 102 meshed with a planetary gear 101 of the planetary gear mechanism 86. Note that illustration of the teeth of the sun gear 102 is omitted in FIG. 6.

The speed reducer case 85 includes a first face plate 103 matched and secured to the flat face 91 of the electric motor case 87, the first face plate 103 matching the flat face 91, and a second face plate 106. A ring gear 105 of the planetary gear mechanism 86 is sandwiched and secured between the first face plate 103 and the second face plate 106.

The first face plate 103 includes a flat face 107 as the joining face to interconnect with the electric motor case 87. In a center part of the first face plate 103, an output shaft hole 108 which the output shaft 88 of the electric motor 3 passed through is provided.

In a center part of the second face plate 106, an axle hole 111 which the axle 109 of the rear wheel 8 passes through is provided.

The speed reducer case 85 includes a positioning section 112 disposed concentrically with the output shaft 88 and the positioning opening 92, and combined with the electric motor case 87.

The positioning section 112, which has a cylindrical shape, is provided in a central part of the flat face 107 of the first face plate 103, and protrudes to the side of the electric motor case 87. The outer diameter of the positioning section 112 is fitted into the inner diameter of the positioning ring 93 through the positioning opening 92 of the arm 72.

The positioning section 112 has an output shaft hole 108, through which the output shaft 88 is passed into the speed reducer case 85. To an end edge of the output shaft hole 108 on the side of the electric motor case 87, there is attached a seal member 113 being in contact with the outer diameter of the output shaft 88 to separate the internal space of the electric motor case 87 from the internal space of the speed reducer case 85. The output shaft 88 has a smaller diameter in a portion, referring to a small diameter portion 116, inserted into the speed reducer case 85 than a contact part 115 with the seal member 113. The small diameter portion 116 of the output shaft 88 has a smaller diameter than the inner diameter of the seal surface of the seal member 113, that is, the inner diameter of the seal member 113.

The planetary gear mechanism 86 includes the sun gear 102 being integral with the output shaft 88 of the electric motor 3, the ring gear 105 being disposed concentrically with the sun gear 102, the plurality of planetary gears 101 disposed between the sun gear 102 and the ring gear 105, the plurality of planetary gears 101 being meshed with the both, and a planetary carrier 117 revolvably supporting the planetary gear 101 around the sun gear 102.

The ring gear 105 is sandwiched and secured between the first face plate 103 and the second face plate 106 with its outer peripheral surface being exposed to the outside of the speed reducer case 85. The ring gear 105 has a gear (not shown) in the inner peripheral surface corresponding to the inner side of the speed reducer case 85. The gear in the inner peripheral surface is meshed with the planetary gear 101.

The planetary gear 101 is rotatably supported by the planetary carrier 117 via a gear shaft 118.

The planetary carrier 117 is combined to the axle 109 of the rear wheel 8 and is integrated therewith. The planetary carrier 117 is rotatably supported by a second bearing 119 provided in the first face plate 103, and a third bearing 121 provided in the second face plate 106.

The second bearing 119 supports the planetary carrier 117 with its inner ring or the inner peripheral side being fitted into the outer periphery of the sleeve provided in the first face plate 103, and with its outer ring or the outer peripheral side being fitted into a bearing recess 122 provided in the planetary carrier 117.

The third bearing 121 is secured with its outer ring or its outer peripheral side being fitted into the bearing recess 123 of the second face plate 106, and supports the planetary carrier 117 via an axle 109 disposed in its inner ring or its inner peripheral side.

The planetary carrier 117 is provided with a fourth bearing 125 rotatably supporting one end part of the output shaft 88 of the electric motor 3. The fourth bearing 125 is provided in the speed reducer case 85, and rotatably supports one end part of the output shaft 88. The output shaft 88 successively includes from one end side disposed in the speed reducer case 85, a supported part 126 supported by the fourth bearing 125, the sun gear 102 of the planetary gear mechanism 86, the small diameter portion 116 including the supported part 126 and the sun gear 102, and the contact part 115 of the seal member 113.

A meshing length L1 between the sun gear 102 and the planetary gear 101, that is, an insertion of the sun gear 102 into the planetary gear 101 is larger than an insertion depth L2 of the positioning section 112 into the positioning opening 92. That is, there is a relation of (the meshing length L1)>(the insertion depth L2).

An insertion depth L3 of the output shaft 88 into the fourth bearing 125 is smaller than the insertion depth L2 of the positioning section 112 into the positioning opening 92. That is, there is a relation of (the insertion depth L2)>(the insertion depth L3).

A distance L4 from the contact part 115 to the small diameter portion 116 is smaller than the insertion depth L2 of the positioning section 112 into the positioning opening 92. That is, there is a relation of (the insertion depth L2)>(the distance L4 from the contact part 115 to the small diameter portion 116).

The insertion depth L3 of the output shaft 88 into the fourth bearing 125 is larger than the distance L4 from the contact part 115 to the small diameter portion 116. That is, there is a relation of (the distance L4 from the contact part 115 to the small diameter portion 116)<(the insertion depth L3).

Thus, there are relations of (the insertion depth L2)>(the distance L4) and (the distance L4)<(the insertion depth L3).

Thus, there are relations of (the meshing length L1)>(the insertion depth L2)>(the insertion depth L3)>(the distance L4).

The thus configured driving apparatus 69 of the electric vehicle 1 according to the present embodiment is assembled in the following procedure.

FIGS. 7 to 10 are diagrams showing an assembly process of the driving apparatus of the electric vehicle according the embodiment of the present invention.

Figure 7:
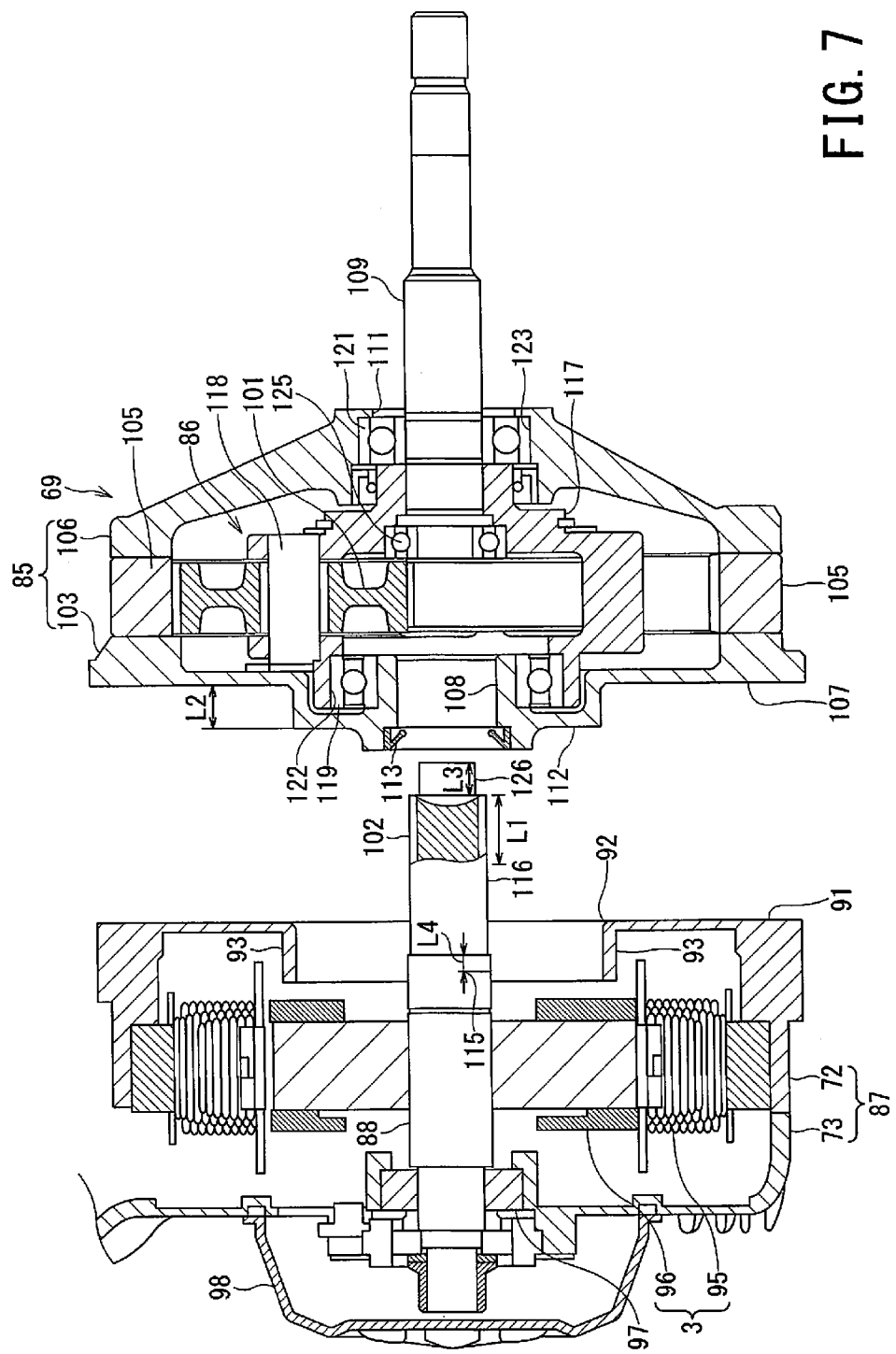
FIG. 7 is a diagram showing an assembly process of the driving apparatus of the electric vehicle according to the embodiment of the present invention.
Figure 8:
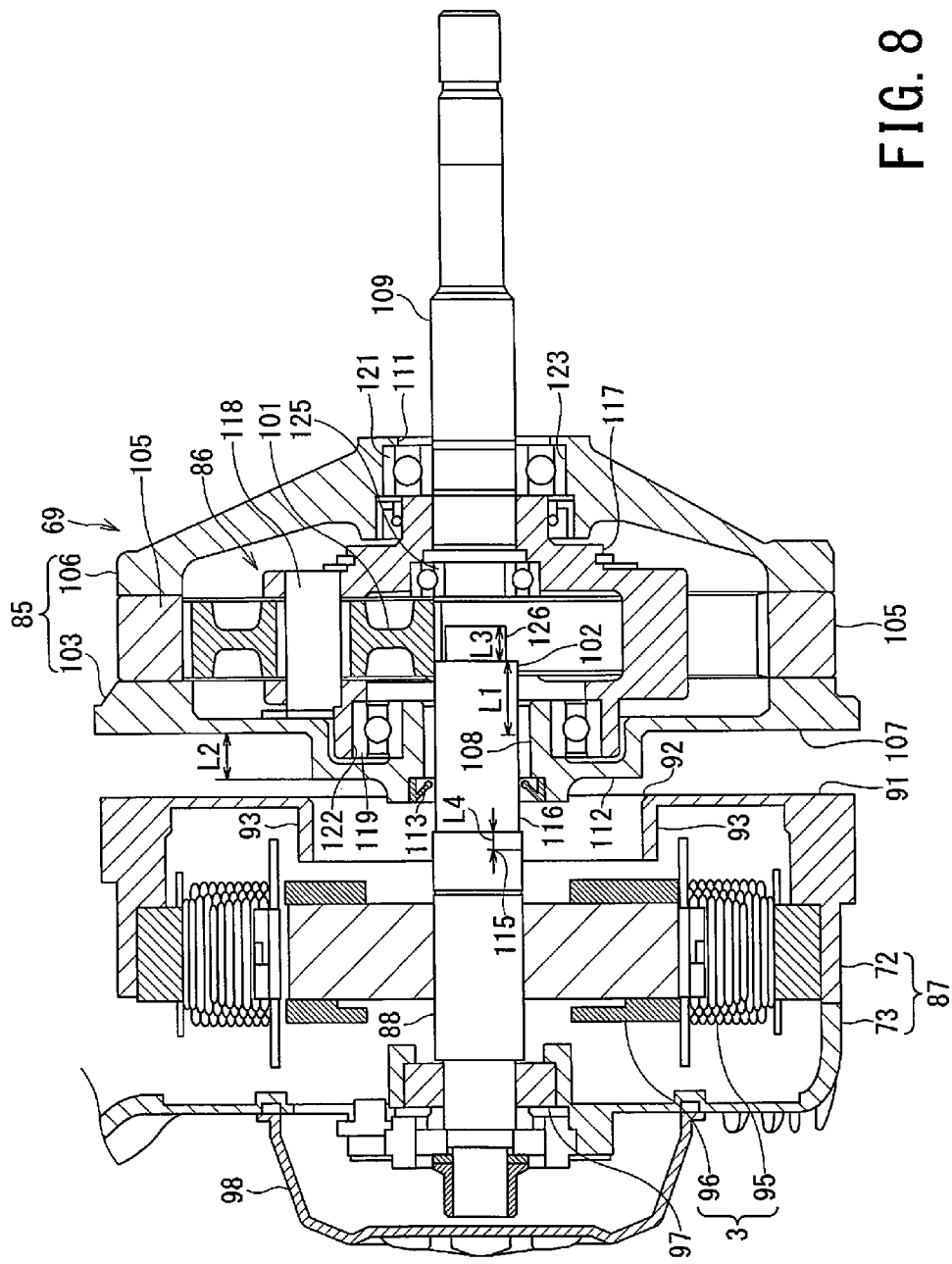
FIG. 8 is a diagram showing the assembly process of the driving apparatus of the electric vehicle according to the embodiment of the present invention.
Figure 9:
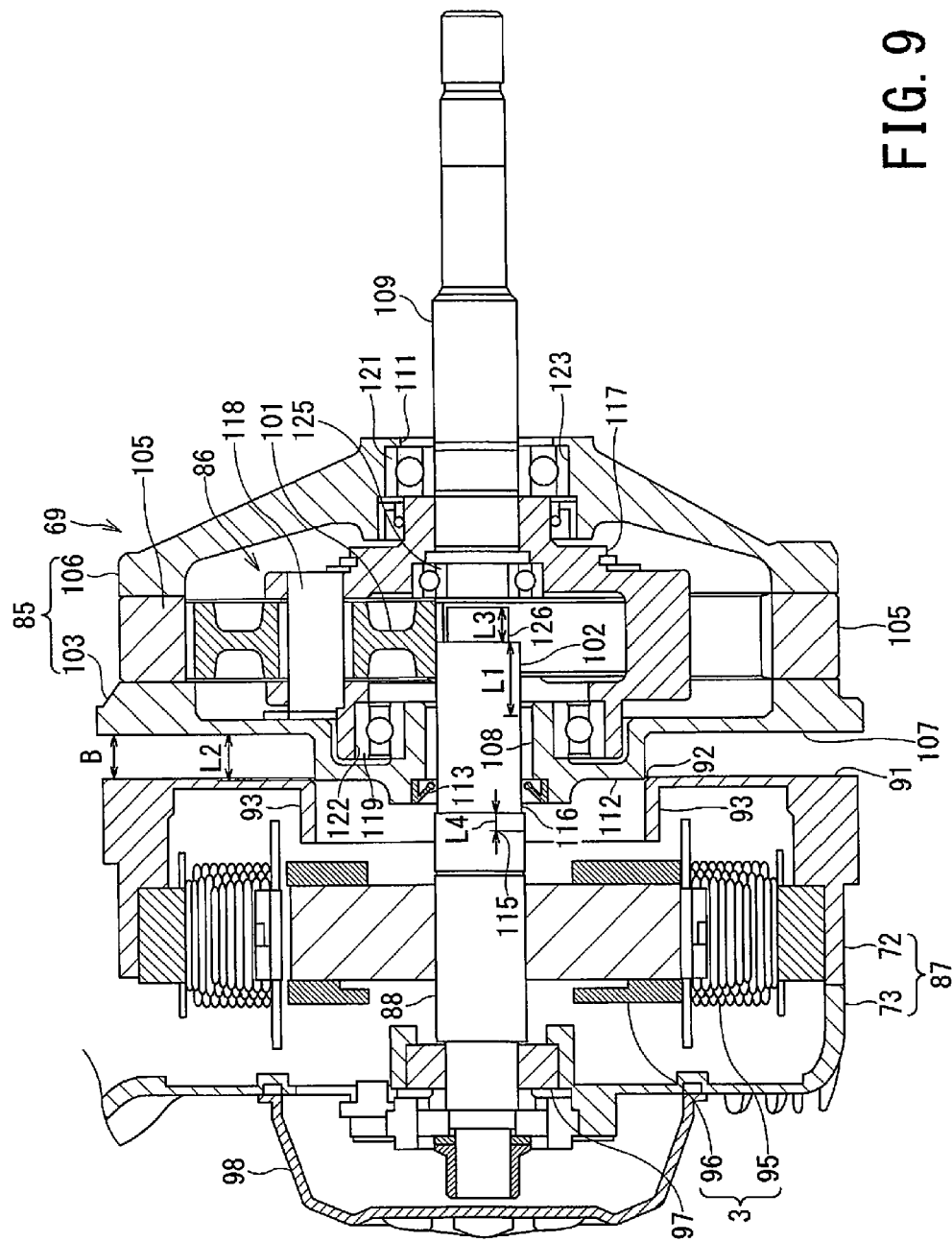
FIG. 9 is a diagram showing the assembly process of the driving apparatus of the electric vehicle according to the embodiment of the present invention.
Figure 10:
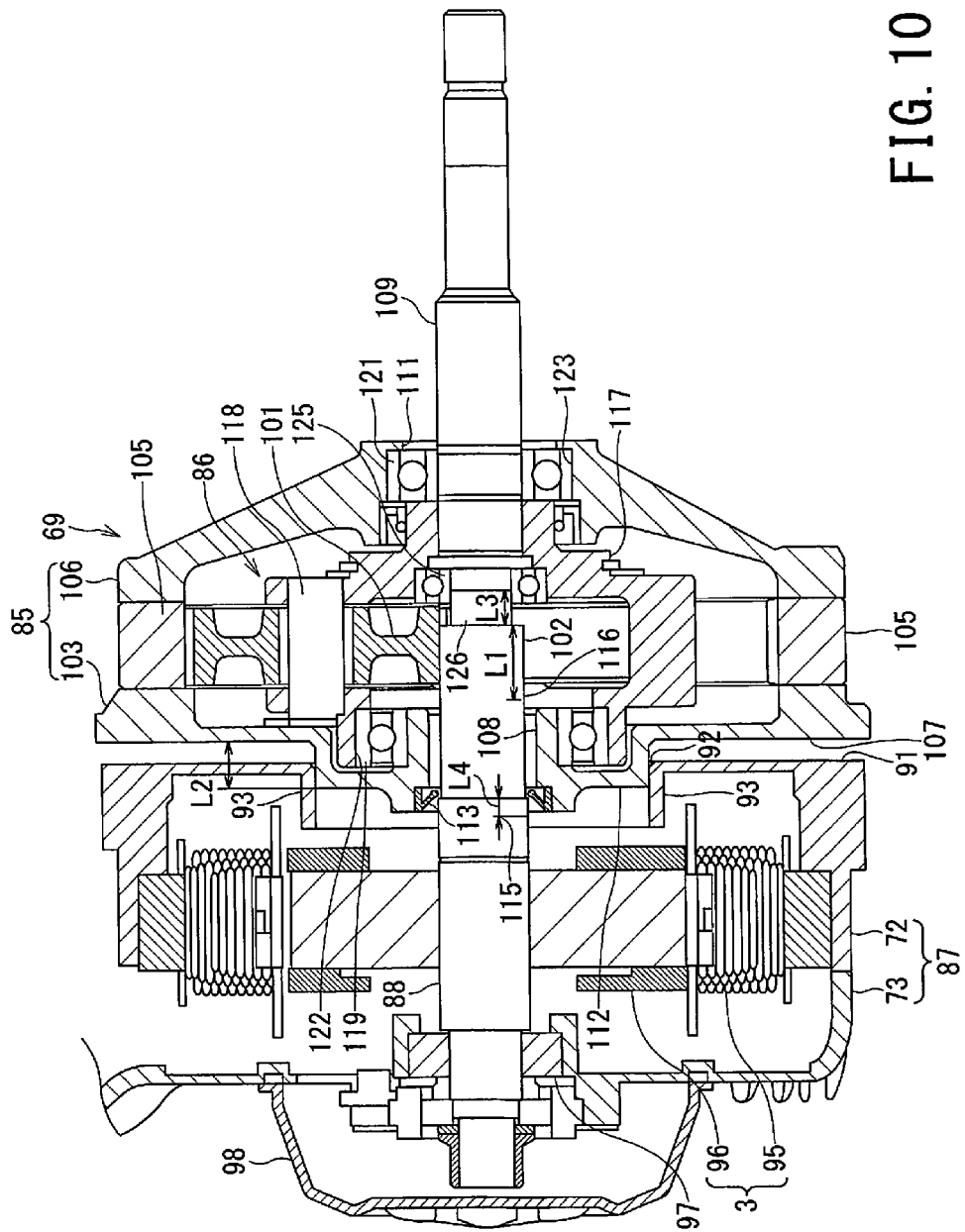
FIG. 10 is a diagram showing the assembly process of the driving apparatus of the electric vehicle according to the embodiment of the present invention.

FIG. 7 shows a state before the output shaft 88 is inserted into the speed reducer case 85. FIG. 8 shows a state in which the sun gear 102 has started meshing with the planetary gear 101. FIG. 9 shows a state in which the positioning section 112 has started being inserted into the positioning opening 92. FIG. 10 shows a state in which the output shaft 88 has started being inserted into the fourth bearing 125.

As shown in FIGS. 7 to 10, in the assembly method of the driving apparatus 69 of the electric vehicle 1 according to the present embodiment, first, the electric motor case 87, the electric motor 3 being provided in the electric motor case 87 with an output shaft 88 protruding outside the electric motor case 87 and generating driving force of a rear wheel 8, the speed reducer case 85 being combined with the electric motor case 87, and the planetary gear mechanism 86 being provided in the speed reducer case 85 and transferring the driving force at a reduced speed from the output shaft 88 to the rear wheel 8, are prepared.

Note that the sun gear 102 being meshed with the planetary gear 101 of the planetary gear mechanism 86 is integrally provided in the output shaft 88.

The positioning section 112 being disposed concentrically with the output shaft 88 and being combined with the electric motor case 87 is provided in advance in the speed reducer case 85.

The fourth bearing 125 rotatably supporting the end part of the output shaft 88 is provided in the speed reducer case 85.

The output shaft hole 108 for passing the output shaft 88 into the speed reducer case 85 is provided in the positioning section 112.

The seal member 113 in contact with the output shaft 88 is provided in the output shaft hole 108.

The output shaft 88 is configured such that a portion being inserted into the speed reducer case 85 deeper than the contact part 115 with the seal member 113 is, has a diameter smaller than the inner diameter, the seal surface, of the seal member 113.

The electric motor 3 is disposed in the electric motor case 87 in advance, and the planetary gear mechanism 86 except the sun gear 102 is disposed in advance in the speed reducer case 85. That is, the electric motor components including the electric motor case 87 are assembled in advance, and the planetary gear mechanism 86 excepting the sun gear 102 is assembled in advance.

Then, in combining the speed reducer case 85 and the electric motor case 87, a tip end of the output shaft 88 that is not in a vertical state, but in an inclined state with respect to the joining face 91 is moved closer to the output shaft hole 108 in such a way not to damage the seal member 113 (FIG. 7). Then, with the position of the speed reducer case 85 being adjusted to the inclination of the output shaft 88, the output shaft 88 is inserted into the output shaft hole 108 in such a way not to damage the seal member 113, and the sun gear 102 and the planetary gear 101 are meshed with each other (FIG. 8). At this time, the positioning section 112 has not reached the electric motor case 87 yet. Then, the position of the output shaft 88 which tip end, the sun gear 102, is held by the planetary gear 101 is modified to an appropriate position, that is, a state of being perpendicular to the joining face 91 by moving the speed reducer case 85, and then the positioning section 112 is combined with the electric motor case 87 (FIG. 9).

Upon assembling the speed reducer case 85 with the electric motor case 87, when insertion of the positioning section 112 into the positioning opening 92 progresses after the positioning section 112 has started to be combined with the electric motor case 87, the output shaft 88 starts to be inserted into the fourth bearing 125 (FIG. 10).

Further, when the speed reducer case 85 closer to the electric motor case 87, causing the output shaft 88 to proceed to the speed reducer case 85, the seal member 113 comes into contact with the output shaft 88, and the joining face 91 touches the flat face 107 of the first face plate 103, completing the insertion of the output shaft 88 (FIG. 6).

That is, upon assembling the speed reducer case 85 with the electric motor case 87, the output shaft 88 is inserted into the fourth bearing 125 after the positioning section 112 has started to be combined with the electric motor case 87, and the seal member 113 comes into contact with the output shaft 88 after the output shaft 88 is inserted into the fourth bearing 125 (FIGS. 6 and 10).

Upon assembling the speed reducer case 85 with the electric motor case 87, first, a protruding end, that is, the tip end of the output shaft 88 of the electric motor 3 is inserted into the speed reducer case 85 through the inner side of the seal member 113 (FIG. 8). At this moment, the output shaft 88 of the electric motor 3 is inclined in some directions departing from an original position, that is, the rotational center line of the rear wheel 8 due to magnetic force acting between the stator 95 and the rotator 96 (FIG. 7). Thus, the joining faces of the speed reducer case 85 and the electric motor case 87 face with each other in a mutually inclined manner. Note that in FIGS. 7 and 8, for the sake of clarity, inclinations of the output shaft 88 and the rotator 96 are not shown or represented.

Next, the sun gear 102 and the planetary gear 101 are meshed with each other, and then the positioning section 112 is combined with the electric motor case 87.

The meshing length L1 between the sun gear 102 and the planetary gear 101 is larger than the insertion depth L2 of the positioning section 112, and there is a relation of (the meshing length L1)>(the insertion depth L2). Consequently, when moving the speed reducer case 85 closer to the electric motor case 87, first, the sun gear 102 is meshed with the planetary gear 101, and then the positioning section 112 is fitted into the electric motor case 87. After the sun gear 102 and the planetary gear 101 are meshed with each other, the inclinations of the output shaft 88 of the electric motor 3 and the rotator 96 are corrected together with the speed reducer case 85, thereby the inclination of the output shaft 88 is changed to coincide with the rotational center line of the rear wheel 8, to make the joining face, that is, the flat face 107 on the side of the speed reducer case 85 and the joining face, that is, the flat face 91 of the electric motor case 87 face with each other in a parallel fashion.

After making the joining face on the side of the speed reducer case 85 and the joining face of the electric motor case 87 face with each other in a parallel fashion, the speed reducer case 85 is moved closer to the electric motor case 87 so that the positioning section 112 is combined with the electric motor case 87 (FIG. 9). That is, after the sun gear 102 and the planetary gear 101 are meshed with each other, the positioning section 112 is fitted into the positioning ring 93 through the positioning opening 92 of the electric motor case 87. When the positioning section 112 starts to be fitted into the positioning ring 93, the center positions of the electric motor 3 and the planetary gear mechanism 86 coincide.

At this moment, a phase difference, which is difference in rotational angle with respect to the center line of the electric motor 3 or the planetary gear mechanism 86, between the electric motor case 87 and the speed reducer case 85 can be dissolved by rotating the axle 109 of the rear wheel 8, and rotating the speed reducer case 85 together with the ring gear 105 of the planetary gear mechanism 86, thereby adjusting the phase relation between the electric motor case 87 and the speed reducer case 85 to a normal position.

When, in a state in which the sun gear 102 is meshed with the planetary gear 101, the positioning section 112 is fitted into the positioning ring 93, and phase difference between the electric motor case 87 and the speed reducer case 85 is dissolved (FIG. 9), the speed reducer case 85 is moved closer to the electric motor case 87, and the output shaft 88 starts to be inserted into the fourth bearing 125 (FIG. 10). Although a gap between the seal member 113 and the small diameter portion 116 is kept and the output shaft 88 is introduced into the speed reducer case 85 in the processes described so far, after the sun gear 102 is meshed with the planetary gear 101, the positioning section 112 is fitted into the positioning ring 93, and the output shaft 88 starts to be inserted into the fourth bearing 125, the seal member 113 comes into contact with the output shaft 88 to liquid-tightly define the inside of the electric motor case 87 and the inside of the speed reducer case 85, thereby preventing lubricant oil in the speed reducer case 85 from moving into the electric motor case 87.

Then, when the joining face of the electric motor case 87 touches the joining face of the speed reducer case 85, the positional relations of the electric motor case 87, the speed reducer case 85, the electric motor 3, and the planetary gear mechanism 86 are determined. Then, the speed reducer case 85 is secured to the electric motor case 87 with fasteners (not shown), for example, a bolts (FIG. 6).

Since the driving apparatus 69 of the electric vehicle 1 and method for assembling the driving apparatus 69 of electric vehicle 1 according to the present embodiment is configured such that the meshing length L1 between the sun gear 102 and the planetary gear 101 is larger than the insertion depth L2 of the positioning section 112, when assembling the speed reducer case 85 and the electric motor case 87, it is possible to first mesh the sun gear 102 with the planetary gear 101, and then combine the positioning section 112 with the electric motor case 87. Owing to such structure and assembly method, the driving apparatus 69 holds the output shaft 88 supported in a cantilever manner with the planetary gear mechanism 86 and corrects its inclination when combining the swing arm 9 with the speed reducer 74, thereby making the position of the output shaft 88 appropriate to facilitate the positioning, and thereby facilitating the assembling work. The driving apparatus 69 facilitates the work of inserting the output shaft 88 of the electric motor 3, which protrudes from the electric motor case 87, into the planetary gear mechanism 86, thereby facilitating the combining work between the electric motor case 87 accommodating the electric motor 3, and the speed reducer case 85 accommodating the planetary gear mechanism 86.

Further, since the driving apparatus 69 of the electric vehicle 1 and method for assembling the driving apparatus 69 of electric vehicle 1 according to the present embodiment is configured such that the insertion depth L3 of the output shaft 88 with respect to the fourth bearing 125 is smaller than the insertion depth L2 of the positioning section 112, it is possible to insert the output shaft 88 into the fourth bearing 125 after the positioning section 112 has started to be combined with the electric motor case 87. Owing to such structure and assembly method, the driving apparatus 69 makes it possible that one end part of the output shaft 88, which is located inside the speed reducer case 85 and not visible during assembly, to be surely inserted into the fourth bearing 125, thereby facilitating the assembling work.

Further, since the driving apparatus 69 of the electric vehicle 1 and method for assembling the driving apparatus 69 of electric vehicle 1 according to the present embodiment is configured such that the distance L4 from the contact part 115 to the small diameter portion 116 is smaller than the insertion depth L2 of the positioning section 112, it is possible to cause the seal member 113 to come into contact with the output shaft 88 after the positioning section 112 has started to be combined with the electric motor case 87. Owing to such a structure and an assembly method, the driving apparatus 69 makes it possible to assemble the speed reducer case 85 with the electric motor case 87 without damaging the seal member 113.

Therefore, based on the driving apparatus 69 of the electric vehicle 1 and method for assembling the driving apparatus 69 of electric vehicle 1 of the present invention, the positioning between the speed reducer case 85 and the electric motor case 87 can be reliably performed, thus facilitating the assembly of the speed reducer case 85 with the electric motor case 87.

What is claimed is:

1. A driving apparatus of an electric vehicle, comprising:
    a driving wheel;
    an electric motor case;
    an electric motor provided in the electric motor case, the electric motor having an output shaft protruding outside the electric motor case, the electric motor generating driving force of the driving wheel;
    a speed reducer case combined with the electric motor case; and
    a planetary gear mechanism provided in the speed reducer case, the planetary gear mechanism transferring the driving force at a reduced speed from the output shaft to the driving wheel, wherein
    the output shaft integrally includes a sun gear meshed with a planetary gear of the planetary gear mechanism,
    wherein one of the speed reducer case and the electric motor case includes a positioning section,
    wherein the positioning section is fitted into a positioning ring to determine a relative positional relationship between the electric motor case and the speed reducer case, and
    wherein a meshing length between the sun gear and the planetary gear is larger than an insertion depth of the positioning section in the positioning ring.

2. The driving apparatus of the electric vehicle according to claim 1, further comprising
    a bearing provided in the speed reducer case, the bearing rotatably supporting an end part of the output shaft, wherein
    an insertion depth of the output shaft with respect to the bearing is smaller than the insertion depth of the positioning section.

3. The driving apparatus of the electric vehicle according to claim 2, wherein
    the positioning section has a through hole,
    the output shaft is passed into the speed reducer case through the through hole,
    the through hole is provided with a seal member being in contact with the output shaft,
    the output shaft has a portion inserted into the speed reducer case deeper than a contact part with the seal member is, the portion has a smaller diameter than that of a seal surface of the seal member, and
    a distance from the contact part to the small diameter portion is smaller than the insertion depth of the positioning section.

4. The driving apparatus of the electric vehicle according to claim 3, wherein the seal member is located at the positioning section of the speed reducer case.

5. The driving apparatus of the electric vehicle according to claim 1, wherein
    the positioning section has a through hole,
    the output shaft is passed into the speed reducer case through the through hole,
    the through hole is provided with a seal member being in contact with the output shaft,
    the output shaft has a portion inserted into the speed reducer case deeper than a contact part with the seal member is, the portion has a smaller diameter than that of a seal surface of the seal member, and
    a distance from the contact part to the small diameter portion is smaller than the insertion depth of the positioning section.

6. The driving apparatus of the electric vehicle according to claim 5, wherein the seal member is located at the positioning section of the speed reducer case.

7. The driving apparatus of the electric vehicle according to claim 1, further comprising
    a bearing provided in the speed reducer case, the bearing rotatably supporting an end part of the output shaft, wherein
    the positioning section has a through hole, the output shaft is passed into the speed reducer case through the through hole, the through hole is provided with a seal member being in contact with the output shaft, the output shaft has a portion inserted into the speed reducer case deeper than a contact part with the seal member is, the portion has a smaller diameter than that of a seal surface of the seal member, a distance from the contact part to the small diameter portion is smaller than the insertion depth of the positioning section, and an insertion depth of the output shaft with respect to the bearing is larger than the distance from the contact part to the small diameter portion.

8. The driving apparatus of the electric vehicle according to claim 7, wherein the seal member is located at the positioning section of the speed reducer case.

\* \* \* \* \*